United States Patent
Lee et al.

(10) Patent No.: US 10,353,803 B2
(45) Date of Patent: Jul. 16, 2019

(54) DYNAMIC DEVICE CLUSTERING

(71) Applicant: Facebook, Inc., Menlo Park, CA (US)

(72) Inventors: Eun Chang Lee, San Mateo, CA (US); Xun Li, Foster City, CA (US); Kumar Rangarajan, Cupertino, CA (US); Michael McKenzie Magruder, Carnation, WA (US); Zheng Mi, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/682,268

(22) Filed: Aug. 21, 2017

(65) Prior Publication Data
US 2019/0057019 A1  Feb. 21, 2019

(51) Int. Cl.
*G06F 9/44* (2018.01)
*G06F 9/50* (2006.01)
(Continued)

(52) U.S. Cl.
CPC ...... *G06F 11/3664* (2013.01); *G06F 11/3668* (2013.01); *G06F 9/45558* (2013.01);
(Continued)

(58) Field of Classification Search
CPC .............. G06F 17/30035; G06F 17/13; G06F 17/5009; G06F 17/30557; G06F 17/30867;
(Continued)

(56) References Cited

U.S. PATENT DOCUMENTS 6,862,623 B1 * 3/2005 Odhner ............... G06Q 10/06
709/226
6,901,442 B1 * 5/2005 Schwaller ........... H04L 43/0817
709/223
(Continued)

OTHER PUBLICATIONS

Hongjian Li et al., Energy-efficient migration and consolidation algorithm of virtual machines in data centers for cloud computing, 2015, [Retrieved on Feb. 21, 2019]. Retrieved from the internet: <URL: https://link.springer.com/content/pdf/10.1007%2Fs00607-015-0467-4.pdf> 15 Pages (303-317) (Year: 2015).*
(Continued)

*Primary Examiner* — Anibal Rivera
(74) *Attorney, Agent, or Firm* — FisherBroyles, LLP (57) ABSTRACT

A cluster of devices can be identified where results from executing a test by any cluster devices can be considered as being from the same device. Thus, instead of waiting for a single device to produce comparable results, multiple devices from the same cluster can simultaneously perform the test and obtain the needed set of test results more quickly. The technology can identify clusters of devices that are all similar to a primary cluster device. A device pair can be considered similar when (1) a mean each of a set of test results from each device are within a first threshold of each other, (2) a measurement of the consistency of each test result set are within a second threshold of each other, and (3) a measurement of the consistency of a combination of the test results sets is between the consistency measurements of the individual test result sets.

20 Claims, 6 Drawing Sheets

(51) Int. Cl.
*G06F 9/46* (2006.01)
*G06F 17/30* (2006.01)
*G06F 11/36* (2006.01)
*G06F 11/22* (2006.01)
*G06F 11/34* (2006.01)
*G06F 9/455* (2018.01)
*G06F 16/435* (2019.01)
*G06F 16/9535* (2019.01)

(52) U.S. Cl.
CPC ........ *G06F 9/5066* (2013.01); *G06F 11/2289* (2013.01); *G06F 11/3419* (2013.01); *G06F 11/3495* (2013.01); *G06F 16/437* (2019.01); *G06F 16/9535* (2019.01)

(58) Field of Classification Search
CPC ......... G06F 17/30601; G06F 17/30598; G06F 17/30705; G06F 11/3419; G06F 11/2289; G06F 11/3668; G06F 11/0709; G06F 11/008; G06F 11/3684; G06F 11/3495; G06F 9/50; G06F 9/45558; G06F 9/44589; G06F 9/5077; G06F 9/5061; G06F 9/505; G06F 9/5066; G06F 9/5072; G06F 9/5083; G06F 8/30
See application file for complete search history.

(56) References Cited

U.S. PATENT DOCUMENTS

| | | | | |
|---|---|---|---|---|
| 8,260,840 B1* | 9/2012 | Sirota | G06F 9/5061 | 370/216 |
| 8,296,419 B1* | 10/2012 | Khanna | G06F 9/5072 | 709/201 |
| 8,467,988 B1* | 6/2013 | Roder | H01J 49/004 | 702/116 |
| 8,615,589 B1* | 12/2013 | Adogla | G06F 9/5077 | 709/226 |
| 9,134,961 B1* | 9/2015 | Cohen | G06F 8/30 | |
| 9,170,926 B1* | 10/2015 | Cohen | G06F 11/3684 | |
| 9,317,404 B1* | 4/2016 | Cohen | G06F 11/3684 | |
| 9,317,412 B1* | 4/2016 | Cohen | G06F 11/3688 | |
| 9,372,726 B2* | 6/2016 | Gopalan | G06F 9/4856 | |
| 9,633,144 B2* | 4/2017 | Brehm | G06F 17/5009 | |
| 9,710,295 B2* | 7/2017 | Yamaguchi | G06F 9/5077 | |
| 9,787,704 B2* | 10/2017 | Danielson | H04L 67/1095 | |
| 9,811,387 B2* | 11/2017 | Baughman | G06F 9/5083 | |
| 9,846,841 B1* | 12/2017 | Datta | G06Q 30/02 | |
| 9,864,727 B1* | 1/2018 | Miller | H04L 67/1029 | |
| 9,898,320 B2* | 2/2018 | Tarasuk-Levin | G06F 9/45558 | |
| 9,934,134 B2* | 4/2018 | Cohen | G06F 9/44589 | |
| 9,934,226 B2* | 4/2018 | Alberti | G06F 17/30088 | |
| 9,977,687 B2* | 5/2018 | Kottomtharayil | G06F 9/505 | |
| 2005/0071370 A1* | 3/2005 | Altschul | G06F 17/30035 | |
| 2005/0289071 A1* | 12/2005 | Goin | G06F 11/008 | 705/56 |
| 2005/0289401 A1* | 12/2005 | Goin | G06F 11/0709 | 714/47.3 |
| 2006/0155520 A1* | 7/2006 | O'Neill | G06Q 10/067 | 705/348 |
| 2006/0230407 A1* | 10/2006 | Rosu | G06F 9/5088 | 718/105 |
| 2006/0263753 A1* | 11/2006 | Hoffman | G09B 19/00 | 434/236 |
| 2009/0069009 A1* | 3/2009 | Ma | H04W 88/14 | 455/433 |
| 2009/0292696 A1* | 11/2009 | Shuster | G06F 17/30867 | |
| 2009/0319544 A1* | 12/2009 | Griffin | G06F 17/30557 | |
| 2010/0226561 A1* | 9/2010 | Fujikawa | G06T 7/0002 | 382/141 |
| 2011/0066894 A1* | 3/2011 | Berlyant | G06F 9/5066 | 714/38.1 |
| 2012/0197626 A1* | 8/2012 | Kejariwal | G06F 11/3419 | 703/22 |
| 2013/0174152 A1* | 7/2013 | Yu | G01R 21/00 | 718/1 |
| 2013/0258068 A1* | 10/2013 | Schmidt | H04N 7/18 | 348/49 |
| 2013/0262656 A1* | 10/2013 | Cao | H04L 41/5009 | 709/224 |
| 2013/0283100 A1* | 10/2013 | Asano | G06F 11/3668 | 714/32 |
| 2014/0047079 A1* | 2/2014 | Breternitz | G06F 9/5072 | 709/220 |
| 2014/0047084 A1* | 2/2014 | Breternitz | H04L 67/1008 | 709/221 |
| 2014/0047095 A1* | 2/2014 | Breternitz | G06F 9/5072 | 709/224 |
| 2014/0047227 A1* | 2/2014 | Breternitz | G06F 9/5066 | 713/2 |
| 2014/0047272 A1* | 2/2014 | Breternitz | G06F 11/3495 | 714/32 |
| 2014/0047341 A1* | 2/2014 | Breternitz | G06F 9/505 | 715/735 |
| 2014/0047342 A1* | 2/2014 | Breternitz | G06F 9/5061 | 715/735 |
| 2014/0047444 A1* | 2/2014 | Yamaguchi | G06F 9/5077 | 718/1 |
| 2014/0164600 A1* | 6/2014 | Archer | H04L 43/0882 | 709/224 |
| 2014/0196037 A1* | 7/2014 | Gopalan | G06F 9/4856 | 718/1 |
| 2014/0196038 A1* | 7/2014 | Kottomtharayil | G06F 9/505 | 718/1 |
| 2014/0236560 A1* | 8/2014 | Brehm | G06F 17/5009 | 703/13 |
| 2014/0244664 A1* | 8/2014 | Verma | G06Q 50/01 | 707/749 |
| 2014/0280146 A1* | 9/2014 | Wood | G06F 17/30598 | 707/737 |
| 2014/0280952 A1* | 9/2014 | Shear | H04L 47/70 | 709/226 |
| 2015/0127618 A1* | 5/2015 | Alberti | G06F 17/30088 | 707/678 |
| 2015/0309825 A1* | 10/2015 | Farkas | G06F 9/45558 | 718/1 |
| 2015/0324236 A1* | 11/2015 | Gopalan | G06F 11/1453 | 711/162 |
| 2015/0356462 A1* | 12/2015 | Fawaz | G06N 99/005 | 706/12 |
| 2015/0378771 A1* | 12/2015 | Tarasuk-Levin | G06F 9/45558 | 718/1 |
| 2016/0034305 A1* | 2/2016 | Shear | G06F 9/50 | 707/722 |
| 2016/0065534 A1* | 3/2016 | Liu | H04L 63/1441 | 707/728 |
| 2016/0091393 A1* | 3/2016 | Liao | B23Q 17/0995 | 702/34 |
| 2016/0210224 A1* | 7/2016 | Cohen | G06F 9/44589 | |
| 2016/0261622 A1* | 9/2016 | Danielson | H04L 67/1095 | |
| 2016/0266920 A1* | 9/2016 | Atanasov | G06F 9/45558 | |
| 2016/0292578 A1* | 10/2016 | Ashenfelter | G06F 17/30598 | |
| 2016/0299907 A1* | 10/2016 | Powers | G06F 17/30705 | |
| 2016/0321455 A1* | 11/2016 | Deng | G06F 21/577 | |
| 2016/0358099 A1* | 12/2016 | Sturlaugson | G06N 5/043 | |
| 2016/0359680 A1* | 12/2016 | Parandehgheibi | H04L 63/1425 | |
| 2017/0024660 A1* | 1/2017 | Chen | G06N 99/005 | |
| 2017/0033995 A1* | 2/2017 | Banka | H04L 41/0866 | |
| 2017/0111236 A1* | 4/2017 | Bielenberg | H04L 41/22 | |
| 2017/0199752 A1* | 7/2017 | Cao | G06F 9/45558 | |
| 2017/0235603 A1* | 8/2017 | Baughman | H04W 4/70 | 718/105 |
| 2017/0235616 A1* | 8/2017 | Baughman | G06F 9/5083 | 718/104 |
| 2017/0242725 A1* | 8/2017 | Roth | G06F 9/45533 | |
| 2017/0270717 A1* | 9/2017 | Somani | G07B 5/08 | |
| 2017/0300566 A1* | 10/2017 | Robb | G06F 17/30241 | |
| 2017/0358434 A1* | 12/2017 | Matsuura | G06F 17/30601 | |
| 2018/0046581 A1* | 2/2018 | Banerjee | G06F 12/1009 | |
| 2018/0069778 A1* | 3/2018 | Zhang | H04L 43/50 | |
| 2018/0081891 A1* | 3/2018 | Alberti | G06F 17/30088 | |

(56) References Cited

U.S. PATENT DOCUMENTS

| | | | |
|---|---|---|---|
| 2018/0113610 A1* | 4/2018 | Gopalan | G06F 11/1453 |
| 2018/0113734 A1* | 4/2018 | Yamato | H04L 67/10 |
| 2018/0136980 A1* | 5/2018 | Shaffer | G06F 9/5061 |
| 2018/0137218 A1* | 5/2018 | Subramaniyan | G06F 17/18 |
| 2018/0143878 A1* | 5/2018 | Al-Kiswany | G06F 11/1464 |
| 2018/0157511 A1* | 6/2018 | Krishnan | G06F 9/45558 |

OTHER PUBLICATIONS

Petter Svard et al., Evaluation of delta compression techniques for efficient live migration of large virtual machines, 2011, [Retrieved on Feb. 21, 2019]. Retrieved from the internet: <URL: https://dl.acm.org/citation.cfm?id=1952698> 10 Pages (111-120) (Year: 2011).*

* cited by examiner

DYNAMIC DEVICE CLUSTERING

BACKGROUND

Software applications and products can be subjected to various test cases during development and deployment. For example, during bug fixing or feature enhancement, a typical design practice involves running a test plan, including multiple test cases, for the software application. This can help validate the application and make sure the code changes (e.g. the current "build") did not break any existing functionality. When a change is made to a portion of the software, it can be "committed" to a repository. Upon each commit, the test plan may execute one or more test cases on that build of the software. Moreover, depending on the application being tested, the platform running the test cases may vary. For example, a change to software application code can be deployed on several different devices (e.g., smartphones, tablets, laptops, etc.), which may require running the test cases associated with the build on each device that supports the software application. As a result, testing of large or complicated software applications on different devices can be challenging because it can require execution of numerous test cases that take a long time to execute on a limited number of available devices.

Simply adding additional devices to perform the tests can be problematic because, even with devices that have the same hardware and software configurations, test results (e.g. the amount of time the test took, an amount of memory used, number of processor cycles used, etc.) can vary across test devices. Such test results need to be compared to determine whether the build is broken. However, when this comparison is performed between test results from different devices, differences attributable to how the different devices perform the tests can cause incorrect identifications of malfunctioning or non-malfunctioning builds.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Embodiments for clustering devices, e.g. to aid in build testing, are described. Even when a system uses devices with identical hardware and software (device type, processor, memory, operating system version, and installed components), running identical code, the results can have different performance values. In some instances, such as in testing environments, this can make it difficult to determine the source of a problem. The disclosed system can identify clusters of devices that have similar enough performance on a particular test such that test results generated by the entire cluster can be considered as being from the same device.

The disclosed system can perform device clustering by starting with an initial set of devices with identical hardware and software configurations, running tests on the initial set of devices, measuring the performance at each device, computing multiple statistical values for each device, and clustering devices that have similar statistical values. In some implementations, the system can cluster the devices on a continuous basis. In some implementations, a particular device can be part of different clusters for different purposes (e.g. for different tests).

In some implementations, for a pair devices to be considered similar, each device performs multiple iterations of a test and the mean of their corresponding test result performance values are within a threshold amount of each other. Such a comparison of the mean of test results is referred to herein as a t-test. In some implementations, a pair of devices can be considered similar only if a consistency value is determined for each set of results computed by the pair of devices and a delta between the consistency values is below a delta threshold. Such a comparison of consistency values for the two result sets is referred to herein as a consistency test. In some implementations, a pair of devices can be considered similar only if a combined set of results is selected from the results computed by each of the pair of devices (e.g. by combining the devices' result sets or randomly selecting from each device's result set), computing a combined consistency value for the combined set of results, and the combined consistency value is between the consistency values computed during a consistency test. Such a computation is referred to herein as an expected consistency test. In some implementations, a pair of devices are only considered similar if they pass a combination of the t-test, consistency test, or expected consistency test, e.g. if they pass all three.

In some implementations, for a set of devices that have some device pairs determined to be similar, a cluster can be determined by selecting a "primary" device as the device that is part of the most pairs determined to be similar. The cluster can then also be determined to include each of the devices with which the primary device has been determined to be similar. The cluster can then be used for future executions of the test that was used to generate the device results. When different devices of the cluster are used to perform future iterations of the test, test results can be considered to be from the same device.

Clusters can be defined for a particular test, and in some implementations, a device can be included in multiple clusters for different tests. In some implementations, devices from a cluster can be selected to run the test based on their current or expected processing load. For example, devices can be selected by preferring devices that are included in less clusters (e.g. devices that are expected to be needed for less tests). As another example, devices can be selected by determining which devices are currently performing or scheduled for performing tests.

The disclosed embodiments improve software development technology. As developers create various builds of the software, it can be difficult to determine whether each build contains errors. This is particularly true when the software is concurrently being modified by multiple developers. Some automated testing procedures help identify errors by determining if performance measures change significantly between builds. However, in prior system, these automated systems can either be unreliable due to performance measures that differ due to device variance, or are slow because they require the same device to perform each round of tests. The disclosed technology provides more reliable software development by identifying clusters of devices that are similar enough to avoid device differences causing errors during testing. Furthermore, because the identified similar multiple devices can be used during the testing, the testing can be performed more quickly. Finally, also because additional devices can be utilized to perform tests, more tests can be performed, further increasing the accuracy of the results.

Figure 1:
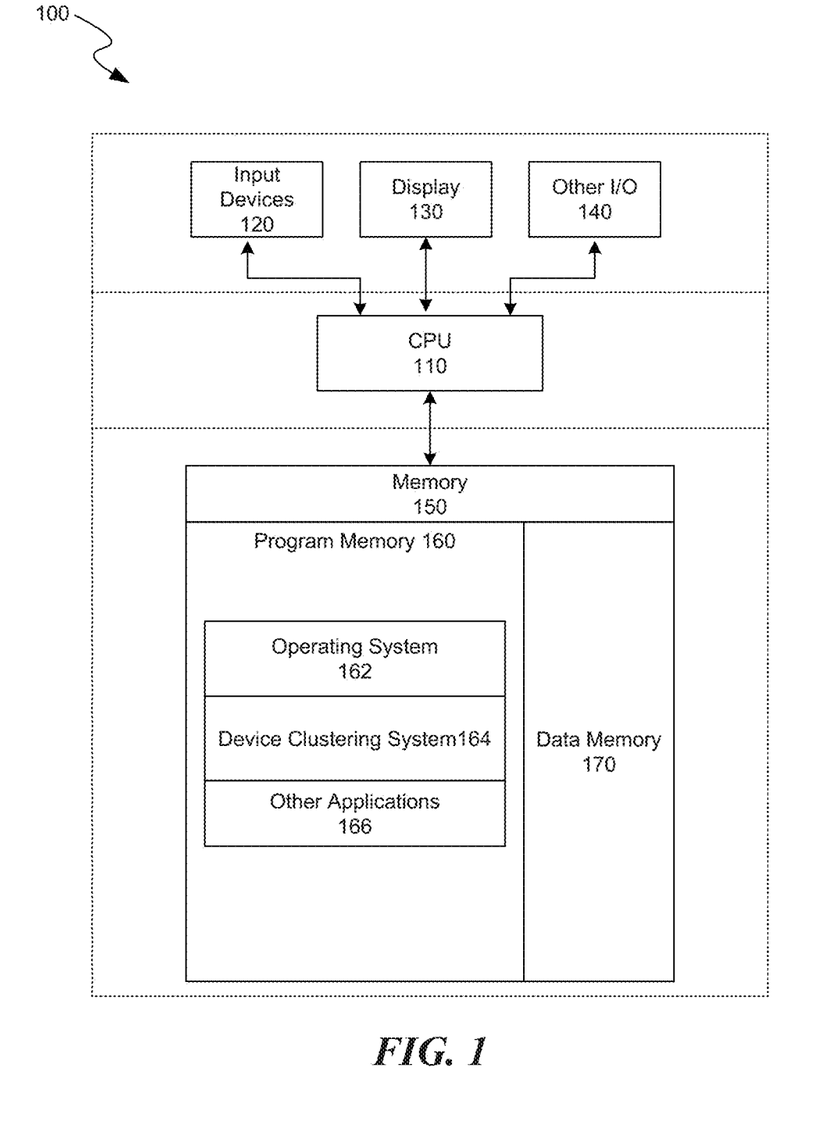
FIG. 1 is a block diagram illustrating an overview of devices on which some implementations can operate.

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that can select clusters of devices with similar performance. Device 100 can include one or more input devices 120 that provide input to the CPU(s) (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150 in a device or distributed across multiple devices. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, device clustering system 164, and other application programs 166. Memory 150 can also include data memory 170 that can include device descriptions, test results, device pair similarity identifications, cluster identifications, configuration data, settings, user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
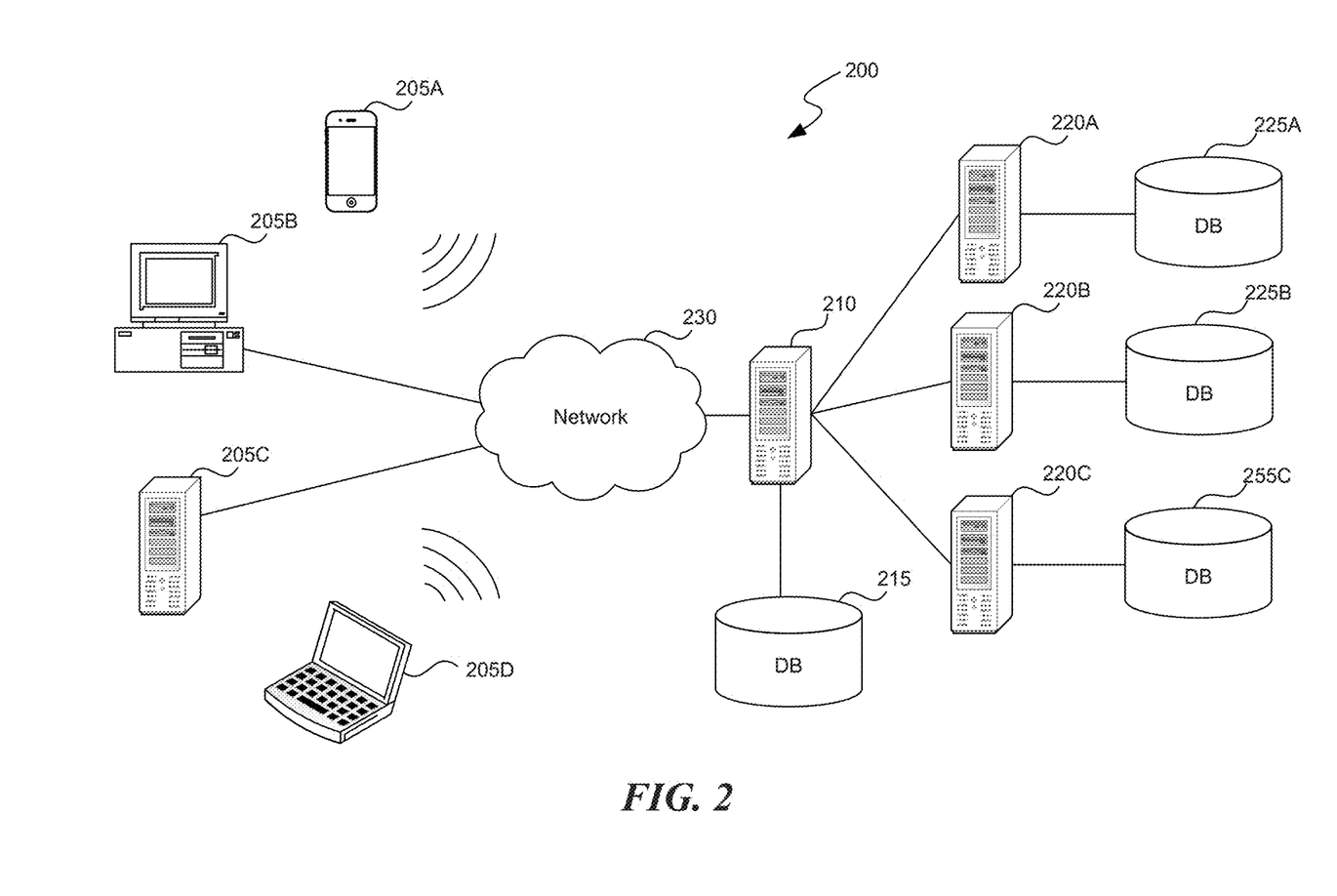
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
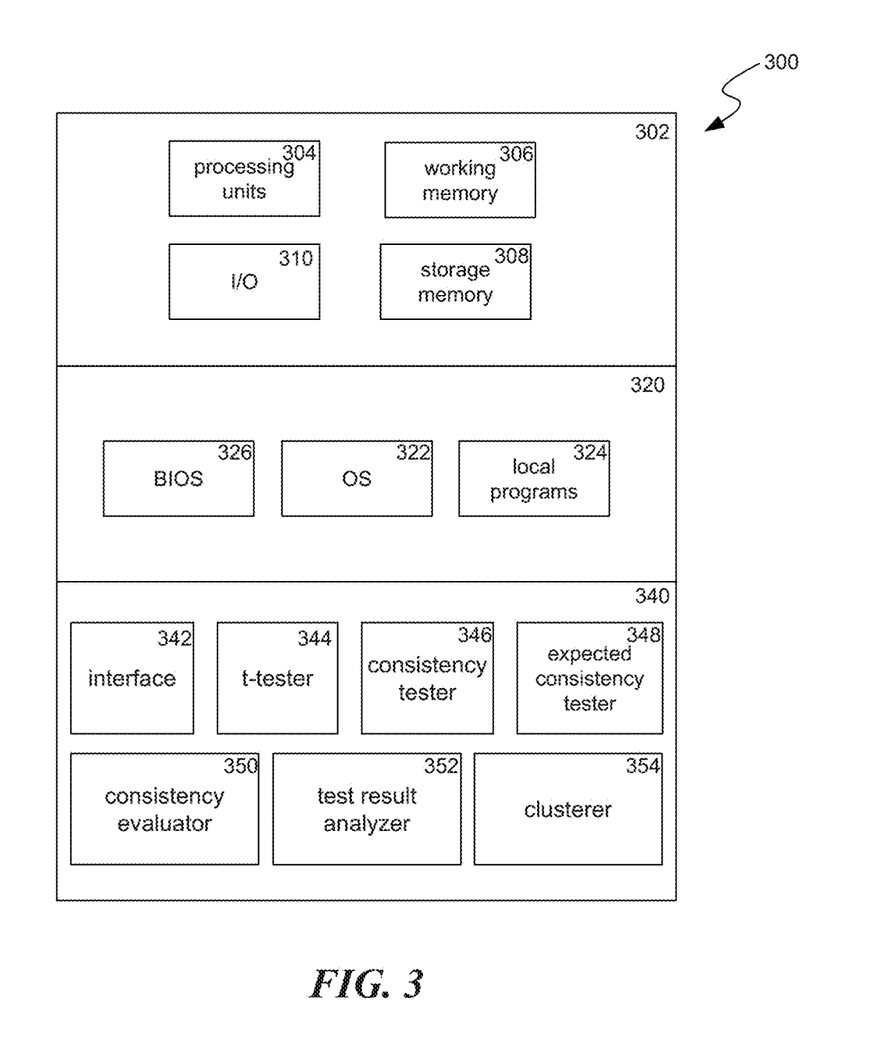
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include t-tester 344, consistency tester 346, expected consistency tester 348, consistency evaluator 350, test result analyzer 352, clusterer 354, and components which can be used for transferring data and controlling the specialized components, such as interface 342. In some implementations, components 300 can be in a computing system that is distributed across multiple computing devices or can be an interface to a server-based application executing one or more of specialized components 340.

Interface 342 can receive identifications of candidate devices, each with a corresponding set of procedure results. The procedure results can be performance measures of the device running a particular procedure such as an amount of time taken, an amount of memory used, a number of processor cycles used, etc. The procedure results can be all for the same procedure, such as a test used to analyze whether a build of a software application is malfunctioning. In some implementations, each candidate device can be associated with multiple procedure results from multiple executions of the procedure. In some implementations, the candidate devices can all have the same hardware and software configurations. In some implementations, the candidate devices can be selected from a pool of available devices. In some implementations, the selection of candidate devices can be based on a measure of current or expected load on the devices. For example, there can be an inverse relationship between how often a device is typically used for build tests and the likelihood that the device will be selected as a candidate device. In some implementations, devices that have been determined to not be similar to other devices above a threshold amount of times can be excluded from being a candidate device. Pairs of candidate devices and their corresponding procedure results can be provided to any of t-tester 344, consistency tester 346, or expected consistency tester 348 to determine whether the pair is sufficiently similar to have results for that procedure be considered as if they were from the same device. In some implementations, the pairs can be randomly selected or the pairs can be all possible pairs among the candidate devices.

T-tester 344 can receive two sets of procedure results, each corresponding to one of the candidate devices, and can determine whether the two result sets are within a threshold level of similarity. In some implementations, t-tester 344 can do this by taking the mean of each result set and determining whether a delta between the means of the two result sets is below a delta threshold. In various implementations, the delta threshold can be whether the two means are within 1%, 2%, or 5% of each other.

Consistency tester 346 can receive two sets of procedure results, each corresponding to one of the candidate devices, and can compute, for each result set, a consistency value for the result set. The consistency value can indicate a level of consistency between the values in the result set. Consistency tester 346 can compute each consistency value by: using the result set as a list of values, determining a delta between each pair of result set items on the list or between all possible pairs of result set items; converting each delta to a percentage by dividing the delta by the larger item in the pair the delta came from; and using consistency evaluator 350 to compute a point on a distribution curve corresponding to a given probability (e.g. P95) of the set of delta percentages. Consistency tester 346 can then compute a difference between the consistency value for each of the two procedure result sets and determine whether that difference is below a consistency difference threshold. Because the deltas are computed as percentages, the consistency values will also be percentages, and the difference will be a difference of percentages. In various implementations, the consistency difference threshold can be whether the difference of the percentages is less than 1%, 2%, or 5%.

Expected consistency tester 348 can receive two sets of procedure results, each corresponding to one of the candidate devices, and can combine values from each result set into a combined result set. In various implementations, the combined result set can be a combination of all the results from the two sets of procedure results, can be a random selection from the two sets of procedure results, or can be a selection that takes half of each of the two sets of procedure results. Expected consistency tester 348 can then compute a consistency value for the combined result set that indicates a level of consistency between the values in the combined result set. Expected consistency tester 348 can compute the consistency value by: using the result set as a list of values, determining a delta between each pair of result set items on the list or between all possible pairs of result set items; converting each delta to a percentage by dividing the delta by the larger item in the pair the delta came from; and computing at a given percentage (e.g. P95), using a probability distribution, a point on the probability distribution curve for the set of delta percentages. Computing the point on the probability distribution curve can be accomplished by providing the set of percentage deltas to consistency evaluator 350. Expected consistency tester 348 can then determine whether the resulting consistency value is between the consistency values computed, by consistency tester 346, for each individual procedure result set.

Consistency evaluator 350 receive a set of value and can define a probability distribution that fits the received set of values. Consistency evaluator 350 can also receive a percentage or can have one specified, and can return a result that is not exceed by more than the given percentage of values of the distribution (e.g. based on an exceedance probability). For example, where the given percentage is 95% (i.e. P95), the returned value can be the tipping point on the x-axis of the distribution where the area under the curve to the left of the tipping point is 95% of the total area under the curve. Alternative methods can be used to compute a consistency value such as the percent-point function, the probability density function, the probability mass function, the cumulative distribution function, the characteristic function, or others.

Test result analyzer 352 can receive outcomes from the t-tester 344, consistency tester 346, or expected consistency tester 348. Test result analyzer 352 can use the outcomes to determine if the device pair that were used to generate the outcomes should be considered similar enough such that future results from executions of the procedure by the pair of devices can be considered as if the results are from the same device. In some implementations, test result analyzer can consider a pair of devices similar unless any of a t-test, a consistency test, or an expected consistency test failed. A t-test fails when the delta between the means of the two result sets is not below the delta threshold. A consistency test fails when the difference between the consistency values for each procedure result set is not below a consistency difference threshold. An expected consistency test fails when the consistency value for the combined result set is not between the consistency values computed for each individual procedure result set.

Clusterer 354 can identify a cluster of devices that are all similar enough such that future results from executions of the procedure by any device in the cluster can be considered as if the results are from the same device. Clusterer 354 can accomplish this by selecting the device, among the candidate devices, that has been most often identified as similar to other devices of the candidate devices. Stated another way, clusterer 354 can receive the device parings that test result analyzer 352 has determined make a pair of similar devices, and select the device that appears in the most of these similar pairings. This device is referred to herein as the "primary" device of the cluster. Clusterer 354 can add the primary device to the cluster. Clusterer 354 can then add all the other devices to the cluster that have been determined to be similar to the primary device. Stated another way, clusterer 354 can select, from the device parings that test result analyzer 352 has determined make a pair of similar devices, the parings that include the primary device, and can add the other device from each selected pairing to the cluster.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
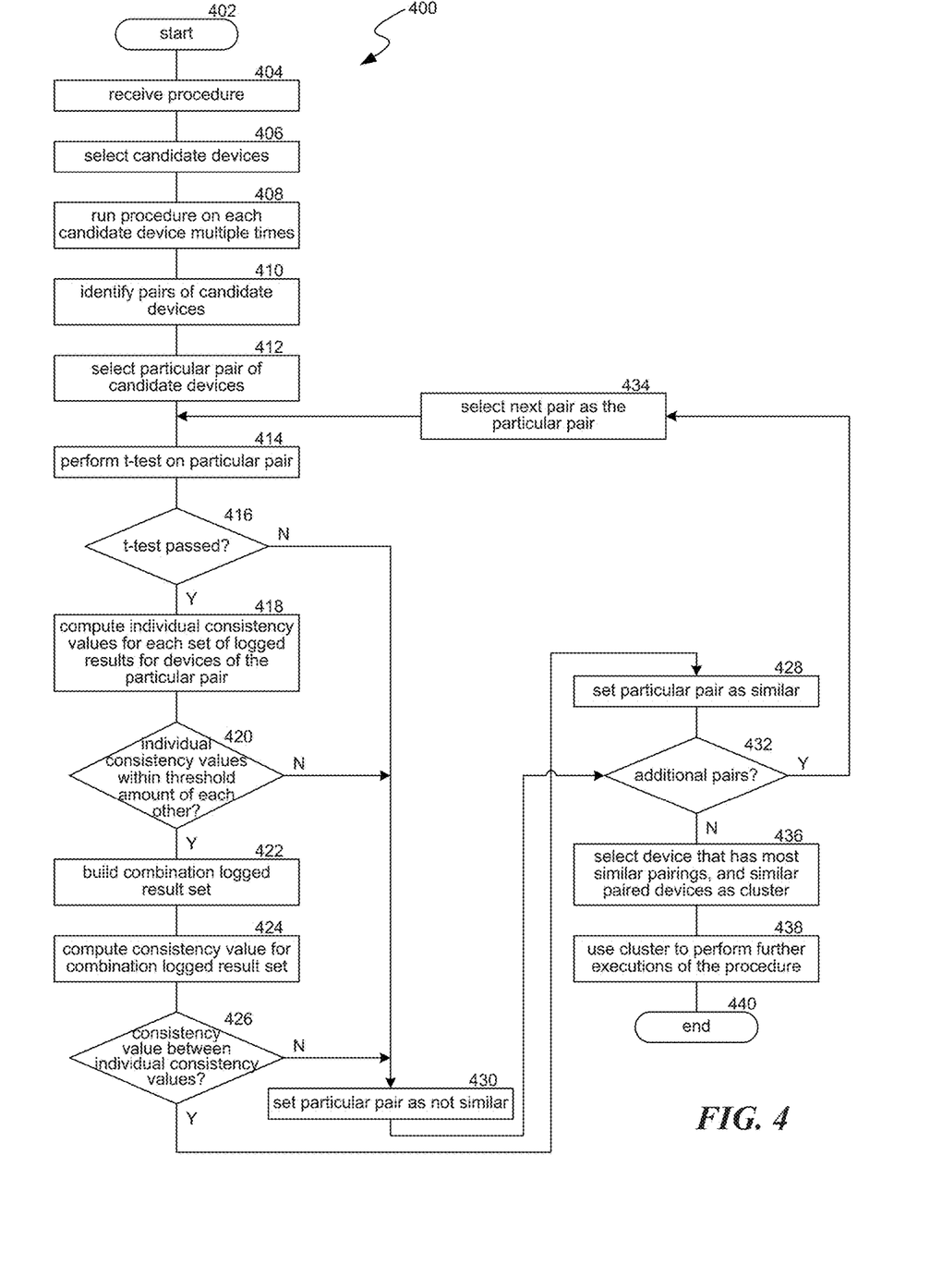
FIG. 4 is a flow diagram illustrating a process used in some implementations for identifying device clusters.

FIG. 4 is a flow diagram illustrating a process 400 used in some implementations for identifying device clusters. Process 400 begins at block 402 and continues to block 404. At block 404, process 400 can receive a procedure. The procedure, for example, can be a test configured to test whether a software build is malfunctioning.

At block 406, process 400 can select a set of candidate devices. In some implementations, the candidate devices can all have the same hardware and software configurations. In some implementations, the candidate devices can be selected from a pool of available devices. In some implementations, the selection can be random or can be based on an availability measure of the devices, such as how many clusters devices have already been assigned to, whether a device is assigned to a cluster for a test that is used frequently or requires a significant amount of processing or memory, a historical log of device resource availability, or etc.

At block 408, process 400 can cause each of the candidate devices selected at block 406 to execute the procedure received at block 404 one or more times. Each execution can produce one or more logged results that are associated with the candidate device that performed the execution. The logged results can be performance measures recorded during the execution, such as an amount of time the execution took, an amount of memory used during the execution, a number of processor cycles used during the execution, a number of thread switches performed during the execution, or etc.

At block 410, process 400 can identify pairs of candidate devices from among the candidate devices selected at block 406. In some implementations, the pairs of devices can be all possible pairings among the candidate devices. At block 412, process 400 can select a first of the identified pairs of candidate devices as a particular pair of candidate devices to be operated on by the loop between blocks 414 and 434.

At block 414, process 400 can perform a t-test on the selected particular pair. Performing the t-test can include computing, for the log set of results corresponding to each device of the pair, a mean of that logged set of results. The t-test can further include comparing the resulting means. At block 416, process 400 can determine whether the particular pair passed the t-test. A t-test can be considered to be passed when the difference between the means is below a threshold. If the t-test is not passed, process 400 can continue to block 430. If the t-test is passed, process 400 can continue to block 418.

At block 418, process 400 can compute individual consistency values for each set of logged results corresponding to the devices of the particular pair. The consistency value can be a measure of deviation between items in a particular set of logged results. Additional details regarding computing a consistency value for a set of logged results are provided below in relation to FIG. 5. At block 420, process 400 can determine whether the individual consistency values computed at block 418 are within a threshold amount (e.g. 5%) of each other. If not, process 400 can continue to block 430; if so, process 400 can continue to block 422.

At block 422, process 400 can build a combination logged result set from the result sets corresponding to the devices of the particular pair of devices. In some implementations, the combination logged result set can be created by selecting all of the items from the result sets corresponding to the devices of the particular pair. In some implementations, the combination logged result set can be created by selecting a particular number of items from the two result sets corresponding to the devices of the particular pair, each item in the combination logged result set selected randomly from one of the two result sets corresponding to the devices of the particular pair. In some implementations, the combination logged result set can be created by selecting a particular number of items, half of which from each of the two result sets corresponding to the devices of the particular pair. At block 424, process 400 can compute a consistency value for the combination logged result set, which can be performed in the same manner as computing the consistency values computed at block 418, and as further described in relation to FIG. 5.

At block 426, process 400 can determine whether the consistency value for the combined logged result set, computed at block 424, is between the individual consistency values for the logged result sets, computed at block 418. If so, process 400 proceeds to block 428, if not, process 400 continues to block 430.

At block 428, having passed each of the t-test at block 416, the consistency test at block 420, and the combined consistency test at block 426, process 400 can identify the particular pair of devices as similar. Alternatively, at block 430, having failed to pass one of the t-test at block 416, the consistency test at block 420, or the combined consistency test at block 426, process 400 can identify the particular pair of devices as not similar. After the identification at block 428 or 430, process 400 can continue to block 432.

At block 432, process 400 can determine whether the loop between blocks 414 and 434 have operated on all the pairs identified at block 410. If there are additional pairs for the loop to operate on, process 400 can proceed to block 434 where the next pair of devices is set as the particular pair of candidate devices for the loop between blocks 414 and 434 to operate on. If there are no additional pairs for the loop to operate on, process 400 can continue to block 436. In some implementations, prior to determining whether there are additional pairs of devices, process 400 can determine whether any device has been determined to be similar to other devices a threshold number of times, in which case process 400 can continue to block 436.

At block 436, process 400 can select, as a "primary" device of a cluster, the device that was most often one of the pair of devices identified as similar at block 428. Process 400 can further add to the cluster, the devices that have been set, at block 428, as similar to the primary device.

At block 438, process 400 can use the cluster determined at block 436 for further executions of the procedure. These further executions of the procedure can produce further logged results which can be considered as from the same device, despite being produced by various of the devices of the cluster. In some implementations, which devices of the cluster are selected to perform the further executions can be based on current or expected load on the cluster devices. In some implementations, the further executions of the procedure can be performed after the devices in the cluster have been modified, e.g. by modifying the software of the cluster devices, such as by installing a new build of a software application. Process 400 can then proceed to block 440, where it ends.

Figure 5:
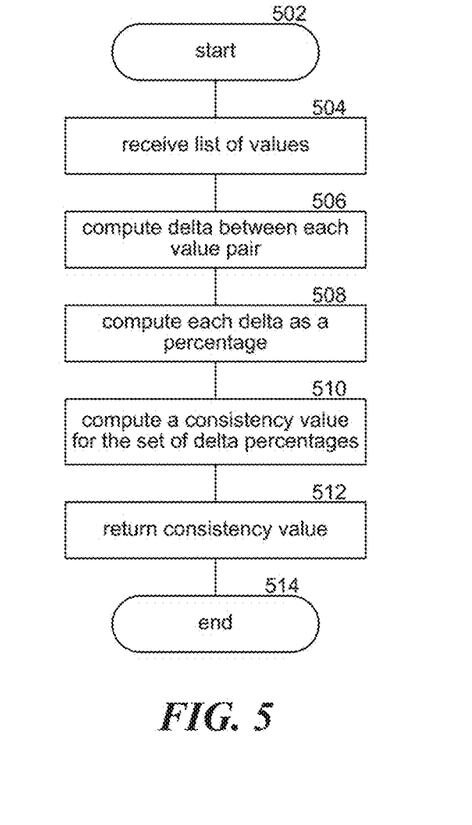
FIG. 5 is a flow diagram illustrating a process used in some implementations for computing a consistency across a set of values.

FIG. 5 is a flow diagram illustrating a process 500 used in some implementations for computing consistency across a set of values. Process 500 begins at block 502 and continues to block 504. At block 504, process of 500 can receive a list of values. In some implementations, the received values are a set of logged results, received from block 418 or 424 of process 400.

At block 506, process 500 can compute a delta between pairs of the received values. In some implementations, the list of values received at block 504 can be an ordered list of values, and the deltas are computed between each pair of proximate results on the list. In some implementations, the deltas are computed between each possible pair of the received values.

At block 508, process 500 can compute each delta, determined at block 506, as a percentage of change between the values. Process 500 can accomplish this by dividing the delta by the larger of the values from the pair that was used to compute that delta. For example, if the list of values included 1, 3, 5, 2, 2, 4, the deltas between these items would be 2, 2, 3, 0, 2, and the percentages of change would be (2/3)=0.67, (2/5)=0.4, (3/5)=0.6, (0/2)=0, and (2/4)=0.5.

At block 510, process 500 can compute a consistency value for the set of delta percentages. In some implementations, the consistency value can be computed as a result of a percent-point function (e.g. at 99%, 95%, or 80%). In various implementations, the probability distribution can be computed using various other techniques such as through an exceedance probability, a probability density function, a probability mass function, a cumulative distribution function, or a characteristic function. For example, the percent-point function can determine, for the given probability, in a probability distribution for the set of delta percentages, the value at which the probability distribution is less than or equal to the given probability. Since the set of delta percentages are already percentage values, the resulting consistency value will also be a percentage value. At block 512, process 500 can return this consistency value. Process 500 can then proceed to block 514, where it ends.

Figure 6:
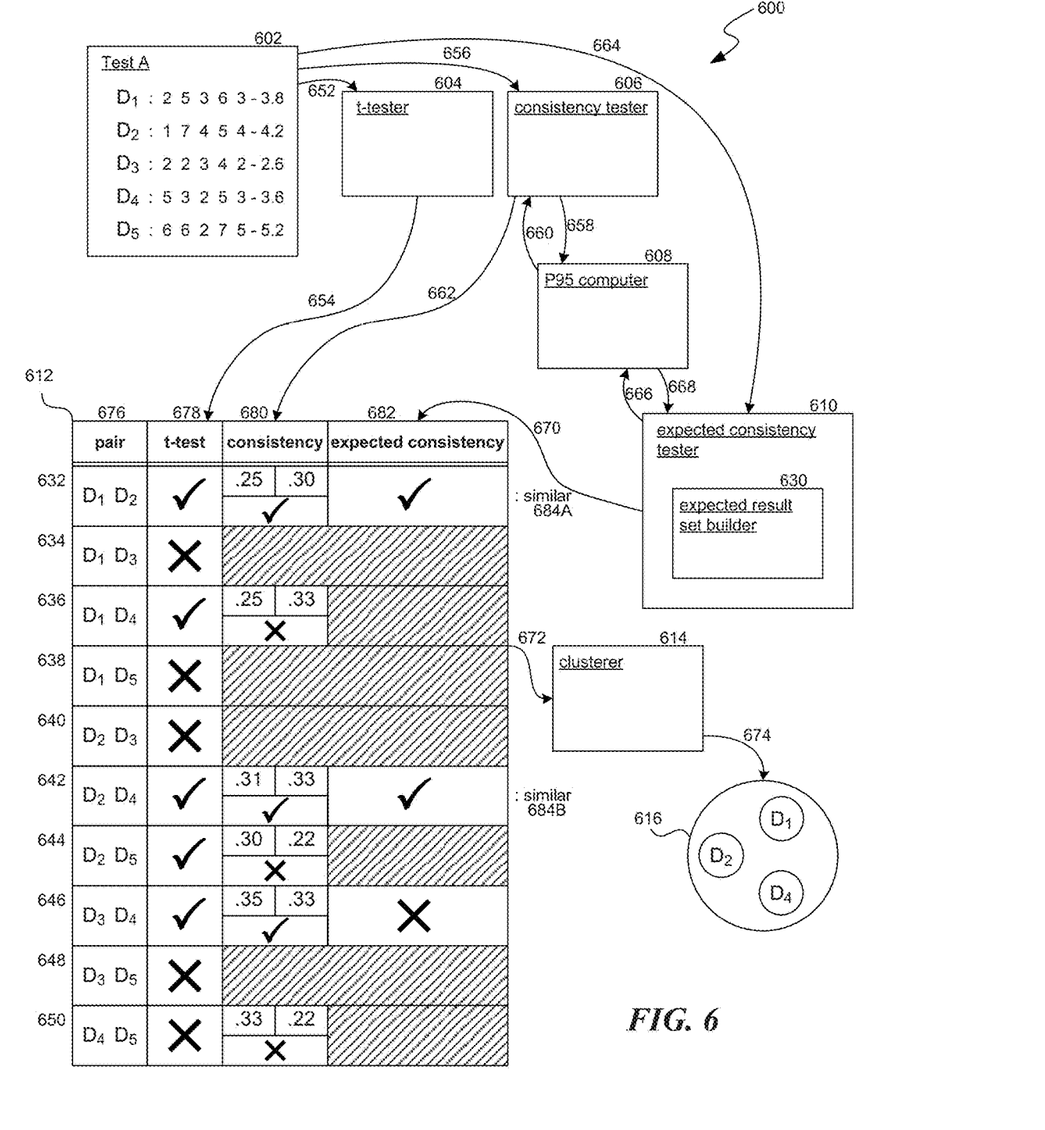
FIG. 6 is a conceptual diagram illustrating an example of identifying a device cluster for devices executing test code.

FIG. 6 is a conceptual diagram illustrating an example 600 of identifying device clusters for devices executing test code. Example 600 includes data 602 identifying a set of devices D1 through D5 with corresponding test results for test A, and a mean value for the test results for each device; t-tester 604; consistency tester 606; P95 computer 608; expected consistency tester 610, with expected result set builder 630; test results 612; cluster 614; and a resulting cluster of devices 616.

Example 600 begins when data 602 is received, and each possible pair of devices with its corresponding data is provided, at step 652, to t-tester 604. T tester 604 can compute the mean for each data set corresponding to a particular device and compare whether the difference in the means for each pair is above a mean delta threshold. In example 600, the mean delta threshold is 1. At step 654, example 600 provides, to 678 of test results 612, an indication for each pair of devices whether the t-test passed, shown as a checkmark for passing t-tests and an X for non-passing t-tests. In example 600, column 676 identifies the pairs of devices, and pairs of devices 632, 636, 642, 644, and 646 pass the t-test, as indicated by checkmarks in column 678.

At step 656, each possible pair of devices with its corresponding data is provided to consistency tester 606. Consistency tester 606 can determine a delta percentage between each value for a particular device in a pair; can pass, at step 658, those delta percentages to P95 computer 608; and can receive, at step 660, a consistency value for the data set for that device. P95 computer 608 can compute consistency values e.g. as a percent-point function at 95% for a received set of delta percentages. In some implementations, consistency values for a data set computed for a device that was part of a previous pair can be re-used when that data set is for the device when it is part of a new pair. Consistency tester 606 can then determine whether a difference between the consistency values corresponding to each pair of devices are within a consistency threshold amount of each other. In example 600, the consistency threshold is 0.05. Consistency values are shown for each pair in column 680 above each determination for whether the consistency values are within the consistency threshold. In example 600, the results are provided to test result 612 at step 662. Row 632, 642, and 646 show that the corresponding consistency values are within the consistency threshold, as indicated by the checkmark in column 680. Rows 636, 644, and 650 show that the corresponding consistency values are not within the consistency threshold, as indicated by the X mark in column 680.

At step 664, each possible pair of devices with its corresponding data is provided to expected consistency tester 610. Expected consistency tester 610 can have expected result set builder 630 generate a combined result set for each pair by randomly selecting, between the two sets of results for a pair, a value until five values have been selected, which become the combined result set. Expected consistency tester 610 can then determine a delta percentage between each value for the combined result set; can pass, at step 666, those delta percentages to P95 computer 608; and can receive, at step 668, a consistency value for that combined result set. Expected consistency tester 610 can then determine whether the returned consistency value for the combined result set is between the consistency values corresponding to each pair of devices from which the combined result set was generated. In example 600, the results are provided to test result 612 at step 670. Rows 632 and 642 show that the corresponding combined consistency values were between the corresponding individual consistency values, as indicated by the checkmark in column 682. Row 646 shows that the corresponding combined consistency value was not between the corresponding individual consistency values, as indicated by the X mark in column 682.

Device pair D1 and D2, shown in column 632, and device pair D2 and D4, shown in column 642, are determined to have passed each of the t-test, consistency test, and expected consistency test. Thus, these two pairs are identified as similar at 648A and 648B. These pairs are passed to clusterer 614 at step 672.

Clusterer 614 can determine which device, in the similar pairs, is identified most often, i.e. is the "primary" device. In example 600, the similar pairs are <D1, D2> and <D2, D4>. Since D2 is identified twice and D1 and D4 are each identified once, D2 is the primary device. Clusterer 614 can select the primary device to be in the resulting cluster 616. Clusterer 614 can then identify which devices are identified with the primary device in a similar pair. In example 600, both D1 and D4 are identified as similar to D2, so these are also selected to be in the resulting cluster 616. Clusterer can provide the resulting cluster 616 at step 674. This device cluster can then be used to perform future executions of test A, where results logged from any of D1, D2, or D4 can be compared to results logged from any other of these devices as if they came from the same device.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for identifying a cluster of devices, the method comprising:
    selecting a set of candidate devices;
    receiving a procedure executable on each of the candidate devices;
    causing two or more of the candidate devices to perform the procedure, wherein each of the two or more of the candidate devices produces logged results in response to performing the procedure;
    selecting a particular pair of candidate devices of the two or more candidate devices;
    computing a delta between the logged results produced by each candidate device of the particular pair of candidate devices;

based on determining that the delta is below a delta threshold, identifying the particular pair of candidate devices as similar candidate devices; and identifying the cluster of devices as the set of devices that includes both:
- a primary device of the candidate devices that has been most often identified as similar to other devices of the candidate devices, and
- a group of one or more devices including devices that have been determined to be similar to the primary device.

2. The method of claim 1, wherein the causing the two or more of the candidate devices to perform the procedure comprises causing the two or more of the candidate devices to each perform the procedure multiple times, wherein the logged results that each of the two or more of the candidate devices produce include a result from each of the multiple performances of the procedure.

3. The method of claim 2, wherein computing the delta between the logged results comprises:
- computing a mean of the results from each of the two or more of the candidate devices; and
- computing the delta as the difference between the means of the results for each device of the particular pair of candidate devices.

4. The method of claim 2, further comprising:
for a particular set of the results from the multiple performances of the procedure by each of the particular pair of candidate devices, computing a consistency value for the particular set of results by:
- computing a difference between multiple pairs of results from the particular set of results;
- converting each difference to a percentage; and
- computing a consistency value for the converted percentage differences;

wherein the identifying the particular pair of candidate devices as similar candidate devices is further based on determining that the consistency value, computed for each of the particular set of results corresponding to each device of the particular pair of candidate devices, are within a threshold difference from each other.

5. The method of claim 4, wherein computing the consistency value comprises computing the P95 percent-point function for the converted percentage differences.

6. The method of claim 4, wherein the set of results from the multiple performances of the procedure by a first device of the particular pair of candidate devices is a first set of results, wherein the set of results from the multiple performances of the procedure by a second device of the particular pair of candidate devices is a second set of results, and wherein the method further comprises:
- selecting a third set of results comprising at least one result from each of the first set of results and second set of results;
- computing a consistency value for the third set of results by:
  - computing a difference value between multiple pairs of results from the third set of results;
  - converting each difference value to a percentage value; and
  - computing a consistency outcome for the converted percentage difference values;

wherein the identifying the particular pair of candidate devices as similar candidate devices is further based on determining that the consistency outcome is between the consistency values computed for the first set of results and for the second set of results.

7. The method of claim 1, wherein the logged results comprise one or more of data recording memory usage during the performance of the procedure, CPU cycles used during the performance of the procedure, or a time expired used during the performance of the procedure.

8. The method of claim 1, wherein the selecting the set of candidate devices is performed by selecting devices that all have the same hardware and software configuration.

9. The method of claim 1, wherein the cluster of devices is a first cluster of devices and the procedure is a first procedure; and
wherein the method further comprises identifying a second cluster of devices for a second procedure, wherein the second cluster of devices includes at least one device that is in the first cluster of devices and at least one device that is not in the first cluster of devices.

10. The method of claim 1, wherein the selecting the set of candidate devices is performed by selecting devices, from a pool of available devices, based on an amount of processing each selected device has performed within a specified time window.

11. The method of claim 1, wherein the selecting the particular pair of candidate devices comprises selecting all possible pairs of candidate devices among the candidate devices;
wherein the computing the delta is performed for all the identified pairs of candidate devices; and
wherein each pair of identified candidate devices is analyzed for being identified as similar based on whether the corresponding delta is below the delta threshold.

12. The method of claim 1, wherein the devices in the identified cluster of devices are used to perform further iterations of the procedure such that results from each iteration of the procedure that the devices in the cluster of devices perform are treated as results from the same device.

13. The method of claim 12, wherein the procedure is a procedure to test a build of software and wherein the further iterations of the procedure are performed by first installing a new build of the software on each device in the cluster of devices before performing the further iterations of the procedure.

14. The method of claim 12, wherein devices within the cluster of devices are selected to perform the further iterations of the procedure based on current load measures of the devices of the cluster of devices.

15. A computer-readable storage medium storing instructions that, when executed by a computing system, cause the computing system to perform operations for identifying a cluster of devices, the operations comprising:
- causing two or more candidate devices to perform a procedure, wherein each of the two or more of the candidate devices produces logged results in response to performing the procedure;
- selecting multiple pairs of the two or more candidate devices; for each particular pair of candidate devices, of the multiple pairs:
- computing a delta between the logged results produced by each candidate devices of the particular pair of candidate devices; and
- performing a classification of the particular pair of candidate devices that excludes the particular pair of candidate devices from being identified as similar candidate devices when the delta is above a delta threshold; and
- identifying the cluster of devices as the set of devices that includes both:

a primary device of the candidate devices that has been most often identified as similar to other devices of the candidate devices, and a group of one or more devices including devices that have been determined to be similar to the primary device.

16. The computer-readable storage medium of claim 15, wherein the causing the two or more of the candidate devices to perform the procedure comprises causing the two or more of the candidate devices to each perform the procedure multiple times, wherein the logged results that each of the two or more of the candidate devices produce include a result from each of the multiple performances of the procedure;

wherein the operations further comprise, for a list of the results from the multiple performances of the procedure by each devices of the particular pair of candidate devices, computing a consistency value for the list of results by: computing a difference between each pair of proximate results on the list of results;

converting each difference to a percentage; and computing a consistency value for the converted list of percentages; and wherein the classification of the particular pair of candidate devices further excludes the particular pair of candidate devices from being identified as similar candidate devices when the consistency values, computed for each of the lists of results corresponding to each device of the particular pair of candidate devices, are not within a threshold difference from each other.

17. The computer-readable storage medium of claim 15, wherein the devices in the identified cluster of devices are used to perform further iterations of the procedure such that results from each iteration of the procedure that the devices in the cluster of devices performs are treated as results from the same device.

18. A system for identifying a cluster of devices, the system comprising:

one or more processors; and a memory storing instructions that, when executed by the system, cause the system to perform operations comprising:

receiving a procedure executable on each of a set of candidate devices;

causing two or more of the candidate devices to perform the procedure, wherein each of the two or more of the candidate devices produces logged results in response to performing the procedure;

selecting a particular pair of candidate devices of the two or more candidate devices;

computing a delta between the logged results produced by each candidate devices of the particular pair of candidate devices;

based on determining that the delta is below a delta threshold, identifying the particular pair of candidate devices as similar candidate devices; and identifying the cluster of devices based on pairs of the candidate devices that have been identified as similar.

19. The system of claim 18, wherein the causing the two or more of the candidate devices to perform the procedure comprises causing the two or more of the candidate devices to each perform the procedure multiple times, wherein the logged results that each of the two or more of the candidate devices produce include a result from each of the multiple performances of the procedure; and wherein computing the delta between the logged results comprises:

computing a mean of the results from each of the two or more of the candidate devices; and computing the delta as the difference between the means of the results for each device of particular pair of candidate devices.

20. The system of claim 18, wherein the devices in the identified cluster of devices are used to perform further iterations of the procedure such that results from each iteration of the procedure that the devices in the cluster of devices perform are treated as results from the same device.

* * * * *